US010573435B2

(12) United States Patent
Field et al.

(10) Patent No.: US 10,573,435 B2
(45) Date of Patent: Feb. 25, 2020

(54) METHOD FOR PRODUCING A MULTIFILAMENT NB₃SN SUPERCONDUCTING WIRE

(71) Applicant: Bruker OST LLC, Carteret, NJ (US)

(72) Inventors: Michael Field, Hoboken, NJ (US); Hanping Miao, Edison, NJ (US); Carlos Sanabria, Tallahassee, FL (US); Jeffrey Parrell, Mountainside, NJ (US)

(73) Assignee: Bruker OST LLC, Carteret, NJ (US)

( * ) Notice: Subject to any disclaimer, the term of this patent is extended or adjusted under 35 U.S.C. 154(b) by 218 days.

(21) Appl. No.: 15/414,972

(22) Filed: Jan. 25, 2017

(65) Prior Publication Data
US 2017/0221608 A1 Aug. 3, 2017

Related U.S. Application Data

(60) Provisional application No. 62/288,555, filed on Jan. 29, 2016.

(51) Int. Cl.
*H01B 12/04* (2006.01)
*H01B 1/02* (2006.01)
(Continued)

(52) U.S. Cl.
CPC .......... *H01B 12/04* (2013.01); *B21C 1/02* (2013.01); *C22C 9/02* (2013.01); *C22C 27/02* (2013.01);
(Continued)

(58) Field of Classification Search
None
See application file for complete search history.

(56) References Cited

U.S. PATENT DOCUMENTS

| 6,981,309 B2* | 1/2006 | Hong | B21C 37/047 174/125.1 |
| 7,216,418 B2* | 5/2007 | Hong | H01L 39/2409 174/125.1 |
| 7,368,021 B2* | 5/2008 | Field | H01L 39/2409 148/98 |
| 7,585,377 B2* | 9/2009 | Field | H01L 39/2409 148/98 |

(Continued)

FOREIGN PATENT DOCUMENTS

WO 2015175064 A2 11/2015

Primary Examiner — Colleen P Dunn
(74) Attorney, Agent, or Firm — Benoit & Côté Inc.

(57) ABSTRACT

Methods for producing a multifilament Nb₃Sn superconducting wire having a Jc value of at least 2000 $A/mm^2$ at 4.2 K and 12 T by a) packing a plurality of Cu encased Nb rods within a first matrix which is surrounded by an intervening Nb diffusion barrier and a second matrix on the other side of the barrier remote from the rods thereby forming a packed subelement for the superconducting wire; b) providing a source of Sn within the subelement; c) assembling the metals within the subelement, the relative sizes and ratios of Nb, Cu and Sn being selected such that (i) the Nb fraction of the subelement cross section including and within the diffusion barrier is from 50 to 65% by area; (ii) the atomic ratio of the Nb to Sn including and within the diffusion barrier of the subelement is from 2.7 to 3.7; (iii) the ratio of the Sn to Cu within the diffusion barrier of the subelement is such that the Sn wt %/(Sn wt %+Cu wt %) is 45%-65%; (iv) the Cu to Nb local area ratio (LAR) of the Cu-encased Nb rods is from 0.10 to 0.30; (v) the Nb diffusion barrier being fully or partially converted to Nb₃Sn by subsequent heat treatment; and (vi) the thickness of the Nb diffusion barrier is greater than the radius of the Nb portions of the Cu encased Nb rods; and d) assembling the subelements in a further matrix and reducing the assemblage to wire form such that (i) the multifilamentary Nb₃Sn superconducting wire is formed of a plurality of the subelements, each having a Nb diffusion barrier to thereby form a wire having a distributed barrier design; (ii) the Nb portions of the copper (Continued)

encased Nb rods in the final wire are of diameter from 0.5 to 7 μm before reaction, and (iii) the Nb diffusion barrier that is fully or partially converted to $Nb_3Sn$ by heat treatment is from 0.8 to 11 μm thickness before reaction; and e) heat treating the final size wire from step d) to form the $Nb_3Sn$ superconducting phases, and multifilament $Nb_3Sn$ superconducting wires made thereby are described herein.

19 Claims, 8 Drawing Sheets

(51) Int. Cl.
*B21C 1/02* (2006.01)
*C22C 9/02* (2006.01)
*C22C 27/02* (2006.01)
*C22F 1/08* (2006.01)
*C22F 1/18* (2006.01)

(52) U.S. Cl.
CPC ............... *C22F 1/08* (2013.01); *C22F 1/18* (2013.01); *H01B 1/026* (2013.01)

(56) References Cited

U.S. PATENT DOCUMENTS

| | | | |
|---|---|---|---|
| 8,522,420 B2* | 9/2013 | Hong | H01F 41/048 174/125.1 |
| 8,943,681 B2* | 2/2015 | Parrell | G01N 3/20 140/93 R |
| 2005/0178472 A1* | 8/2005 | Hong | B21C 37/047 148/98 |
| 2006/0032042 A1* | 2/2006 | Hong | H01L 39/2409 29/599 |
| 2006/0081307 A1* | 4/2006 | Field | H01L 39/2409 148/98 |
| 2008/0163474 A1* | 7/2008 | Hong | H01L 39/2406 29/599 |
| 2008/0274903 A1* | 11/2008 | Field | H01L 39/2409 505/431 |
| 2009/0325809 A1* | 12/2009 | Hong | H01F 41/048 505/433 |
| 2010/0101076 A1* | 4/2010 | Parrell | G01N 3/20 29/605 |
| 2018/0212136 A1* | 7/2018 | Field | H01L 39/2409 |

* cited by examiner

METHOD FOR PRODUCING A MULTIFILAMENT NB₃SN SUPERCONDUCTING WIRE

FIELD OF THE INVENTION

This invention is in the field of superconducting materials and processes for manufacturing the same. More specifically, the invention provides methods for providing a multifilament Nb₃Sn superconducting wire having critical current density.

BACKGROUND OF THE INVENTION

At present, there are two basic fabrication routes for the production of Nb₃Sn superconducting wire. The most common is the "bronze route" that features Nb filaments processed in a bronze (copper-tin) matrix. Wire produced by the bronze route is responsible for the majority of Nb₃Sn wire production in the world. It is popular because, despite the need for intermediate anneals, the production process is rather straightforward and amenable to large lot sizes. For uses requiring higher superconducting critical current levels, the "internal tin" process is used to manufacture wire. In this process, the tin present is separate from copper present until the final heat treatment step. This process is used because the wire so made can deliver several times the supercurrent at high magnetic fields compared to wires made by the bronze process. This is because the internal tin process allows the creation of wire having more tin, and thus the capability to provide more Nb₃Sn in the final wires' cross section.

An important performance measure for superconducting wire is the critical current density, $J_c$. Critical current density is defined as the maximum electric current a wire can carry divided by the cross sectional area (or some defined fraction of the cross sectional area) of the wire. A common form for expressing the critical current density is the non-copper critical current density, where the dividing area is all but the stabilizing copper. The $J_c$ of a Nb₃Sn superconducting strand made by the "internal tin" process (primarily a composite made of Cu, Nb, and Sn and/or their alloys) largely depends upon the fraction of Nb and Sn available in the wire cross section. Generally, the higher the fraction of Nb and Sn within the wire, the higher the fraction of the wire that can be converted to the Nb₃Sn superconducting phase by strand heat treatment. As a result, modern designs for high $J_c$ Nb₃Sn strand made by the "internal tin" process consist of high Nb and Sn fractions, and a low amount of Cu.

Although a wire with the highest theoretical $J_c$ would therefore be made of only Nb and Sn in a stoichiometric 3:1 atomic ratio (since this would maximize the amount of Nb₃Sn in the cross section and minimize the fraction of non-superconducting Cu), in practice a certain amount of Cu is required in the cross section. The copper within the superconducting package or "subelement" serves several purposes, including the following:

1) Cu makes the wire easier to process because it has a hardness level between that of harder Nb and softer Sn. Cu is thus placed amongst the filaments, between the Sn core and Nb filaments, and between the subelements, to aid in the drawing process.
2) A small amount of Cu is needed to reduce the reaction temperature required for converting the Nb and Sn to Nb₃Sn. This is desirable for obtaining Nb₃Sn microstructures that result in a high $J_c$, and it is also desirable from a device manufacturing point of view.
3) The Cu also has an additional function. Cu between the Nb filaments serves as a path for diffusion of Sn, to allow the Sn source to be dispersed throughout the subelements and to all of the Nb filaments. Having adequate Sn locally available to all Nb filaments in a wire during heat treatment is important for reacting the Nb to Nb₃Sn and providing a Nb₃Sn microstructure that results in high $J_c$.

Thus the problem of designing high current density Nb₃Sn wires may be reduced to incorporating the optimum ratio of Nb, Sn, and Cu components in a package that can be fabricated and heat treated to produce a practically useable strand that is electrically stable as a supercurrent approaches its critical value (i.e., so that small non-homogeneities will not cascade the loss of supercurrent appreciable short of its upper bound value, known as a "quench"). It is desirable to design such a wire and provide a method for producing the same. More specifically, it is desirable to provide a unique summation and synergistic integration of all the concepts that produce the high critical current density.

Some past designs such as the "tube process" taught by Murase, U.S. Pat. No. 4,776,899, the disclosure of which is herein incorporated by reference in its entirety, have very high values of Sn wt. %/(Sn wt %+Cu wt %) within the diffusion barrier, and other designs have fine filaments with a low LAR as described infra. Still other designs have distributed diffusion barriers (diffusion barriers around each individual subelement separated by copper instead of a single diffusion barrier encasing all subelements). However, no previous designs have addressed all the issues that are critical for effectiveness and provided a solution to such issues. Field et al., U.S. Pat. No. 7,368,021, the disclosure of which is herein incorporated by reference in its entirety, provides a non-copper critical current density of about 3000 A/mm² at 4.2K, 12 Tesla and about 1700 A/mm² at 4.2K, 15 Tesla and provides an improvement of about tenfold over the initial internal tin superconductor wires and an approximately 50% increase over the prior art values of the late 1990's. The high performance of this conductor is achieved only when the subelement is about 60-180 microns at a typical final wire diameter of 0.5-2.0 mm. It would be desirable to provide similar performance for applications (e.g. particle accelerators) where magnetization and ac losses are beneficially kept to a minimum, and the subelement size is reduced to about 20-60 microns. Field et al., U.S. Pat. No. 7,368,021 provides superconducting wires having reduced performance of, for example, 2600 A/mm² at 4.2K, 12 Tesla and 1300 A/mm² at 4.2K, 15 Tesla at a subelement size of 45 microns. It is desirable to approach the 3000 A/mm² at 4.2K, 12 Tesla value and 1700 A/mm² at 4.2K, 15 Tesla value for a superconducting wire having a subelement size of about 20-60 microns.

SUMMARY OF THE INVENTION

In a first aspect, the present invention provides a method for producing a multifilament Nb₃Sn superconducting wire having a Jc value of at least 2000 A/mm² at 4.2 K and 12 T by
  a) packing a plurality of Cu encased Nb rods within a first matrix which is surrounded by an intervening Nb diffusion barrier and a second matrix on the other side of the barrier remote from the rods thereby forming a packed subelement for the superconducting wire;
  b) providing a source of Sn within the subelement;

c) assembling the metals within the subelement, the relative sizes and ratios of Nb, Cu and Sn being selected such that
  (i) the Nb fraction of the subelement cross section including and within the diffusion barrier is from 50 to 65% by area;
  (ii) the atomic ratio of the Nb to Sn including and within the diffusion barrier of the subelement is from 2.7 to 3.7;
  (iii) the ratio of the Sn to Cu within the diffusion barrier of the subelement is such that the Sn wt %/(Sn wt %+Cu wt %) is 45%-65%;
  (iv) the Cu to Nb local area ratio (LAR) of the Cu-encased Nb rods is from 0.10 to 0.30;
  (v) the Nb diffusion barrier being fully or partially converted to $Nb_3Sn$ by subsequent heat treatment; and
  (vi) the thickness of the Nb diffusion barrier is greater than the radius of the Nb portions of the Cu encased Nb rods; and
d) assembling the subelements in a further matrix and reducing the assemblage to wire form such that
  (i) the multifilamentary $Nb_3Sn$ superconducting wire is formed of a plurality of the subelements, each having a Nb diffusion barrier to thereby form a wire having a distributed barrier design;
  (ii) the Nb portions of the copper encased Nb rods in the final wire are of diameter from 0.5 to 7 µm before reaction, and
  (iii) the Nb diffusion barrier that is fully or partially converted to $Nb_3Sn$ by heat treatment is from 0.8 to 11 µm thickness before reaction; and
e) heat treating the final size wire from step d) to form the $Nb_3Sn$ superconducting phases.

The method may further feature optionally, f) alloying Ta or Ti or both with the Nb or the Cu or the Sn or any combination thereof to provide a dopant to the $Nb_3Sn$ after heat treatment to form $(Nb,Ta)_3Sn$, $(Nb,Ti)_3Sn$ or $(Nb,Ti,Ta)_3Sn$. The Nb or Cu or Sn may be alloyed with the other element or compound for the purpose of strengthening the composite.

The multifilament $Nb_3Sn$ superconducting wire may have a critical current density of at least 2,500 or 3,000 or 3,500 or 4,000 or 5,000 $A/mm^2$ at temperature of 4.2 K and in magnetic field 12 T. The matrix may contain Cu, and the matrix may be a low tin bronze, for instance, Cu 0.1-2.5 wt % Sn, or Cu 0.2-1.5 wt % Sn or Cu 0.5-1.0 wt % Sn or Cu 0.7 wt % Sn. The Nb fraction of the subelement may be from 55% to 60% by area of the cross section area of the subelement including and within the diffusion barrier. The Nb barrier fraction of the total Nb content of the subelement may be from 20-50% or 25-35% by area. The atomic ratio of the Nb to Sn alloy in the subelement may be from 3.1 to 3.6. The ratio of the copper to tin alloy in the subelement may be such that the Sn wt %/(Sn wt %+Cu wt %) within the diffusion barrier is from 50 to 60%. The Cu to Nb local area ratio of the copper-encased Nb rods may be from 0.1 to 0.5. The subelements may be arranged in a pattern so as to manipulate Sn diffusion during the reaction sequence and to maximize $J_c$ and Cu matrix residual resistivity ratio (RRR) for subelements 20-60 microns in diameter. The Nb portions of the copper encased Nb rods in the final wire may be from 1-5 µm diameter before reaction. In fact, at least 25%, 33%, 50%, 67%, 75%, 80% or 90% or so of the Nb portions of the copper encased Nb rods in the final wire may have a diameter of less than about 1.0 µm or 1.5 µm or 2.0 µm or 2.5 µm or 3.0 µm or 4.0 µm or 5.0 µm. The Nb diffusion barrier that is fully or partially converted to $Nb_3Sn$ by heat treatment may be from 1.5-8 µm thick before reaction.

The Sn may be diffused into the Nb rods by a heat treatment process that minimizes dissolution of the Nb in the annulus region with pre-reaction stages at 180° C. to 220° C. for 24-100 hours. This may be followed by 340° C. to 410° C. for 24-50 hours. In turn, this may be followed by a $Nb_3Sn$ formation stage at 625° C. to 725° C. for 12-200 hours. The soak times at each of these three stages of heat treatment may be chosen to maximize conversion of the Nb and Sn to form the superconducting $Nb_3Sn$ phase while allowing nearly complete or complete reaction of the Nb diffusion barrier. In some instances, a fourth stage may be added to the heat treatment sequence prior to the $Nb_3Sn$ reaction stage, of 560° C. to 580° C. for 24-200 hours. Further, in some instances, the Cu encased Nb rods may be formed into hexagonal cross sectioned rods for use in packing the subelement. Still further, the Nb in Cu local area ratio (LAR) may be adjusted or graded to provide a higher LAR in or near the center and a lower LAR near the periphery, near to or proximate to the barrier.

In a second aspect, the present invention provides a multifilament $Nb_3Sn$ superconducting wire having a Jc value of at least 2000 $A/mm^2$ at 4.2 K and 12 T. The non-copper critical current densities of the multifilament $Nb_3Sn$ superconducting wire may be in the range of 2,000 or 3,000 or so $A/mm^2$ at 4.2K and 12 T. The multifilament $Nb_3Sn$ superconducting wire may be made according to the methods described herein. Controlling the following parameters in the distributed barrier subelement design may be used to provide the multifilament $Nb_3Sn$ superconducting wire: the Sn wt %/(Sn wt %+Cu wt %) inside the diffusion barrier; the atomic Nb: Sn ratio including and within the diffusion barrier; the local area ratio in the filament pack region;the reactable Nb diffusion barrier; Nb diffusion barrier thickness relative to the filament radius; optionally adding a dopant such as Ti or Ta to the $Nb_3Sn$; and restacking and wire reduction to control the maximum filament diameter at the heat treatment stage.

DETAILED DESCRIPTION OF THE PREFERRED EMBODIMENTS

Figure 1:
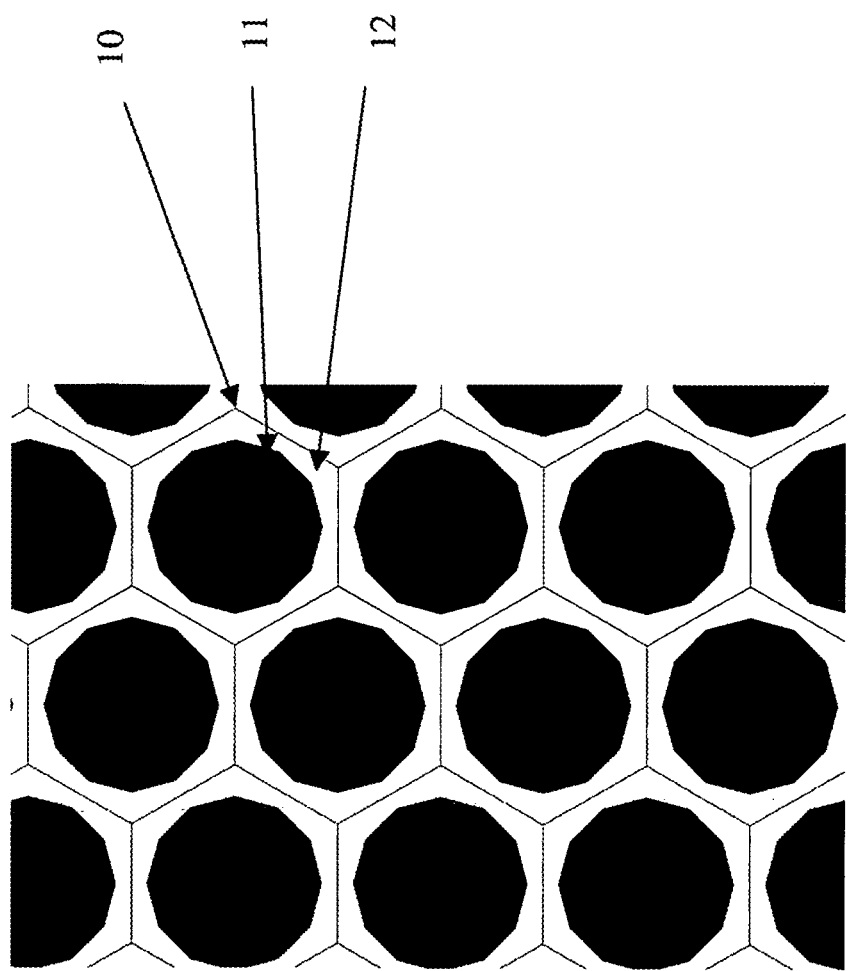
FIG. 1 is an illustration of a filament pack to assist in defining the local area ratio or LAR.

The methods described herein provide three particular advantages over the methods described in the prior art. First, the "Nb in Cu local area ratio (LAR)" may be adjusted or graded inside a billet to provide superior properties to the multifilament $Nb_3Sn$ superconducting wire. The "Nb in Cu local area ratio (LAR)" may not be a single, static value through the subelement. The LAR may be adjusted or graded within a billet to provide different effects in the final product. The LAR may be adjusted or graded to provide a higher LAR in or near the center and a lower LAR near the periphery, near to or proximate to the barrier. This may result in improving the current at small subelement dimensions. Varying the LAR in or near the center, closest to the copper annulus, may change the dynamics of subsequent bronze formation and the formation of the Nb—Cu—Sn ternary phase which acts as a regulatory membrane. Varying the LAR may also create circuitous routes for Sn diffusion through the subelement. This may result in delaying the reaction at smaller sizes and preserving the residual resistivity ratio (RRR) due to the minimum reaction times that are specified due to requirements to achieve coil heat treatment homogeneity.

Second, providing at least a certain percentage of Nb filaments having smaller dimensions, i.e. finer with more rows, may provide improved current in the resulting multifilament $Nb_3Sn$ superconducting wire. For instance, providing at least 25%, 33%, 50%, 67%, 75%, 80% or 90% or so of the Nb filaments having a diameter of less than about 1.0 μm or 1.5 μm or 2.0 μm or 2.5 μm or 3.0 μm or 4.0 μm or 5.0 μm may be particularly advantageous.

Third, while a copper containing matrix may be used in the methods described herein, the matrix may be a low tin bronze (Cu 0.1-2.5 wt % Sn, or Cu 0.2-1.5 wt % Sn or Cu 0.5-1.0 wt % Sn or Cu 0.7 wt % Sn). Such a matrix may provide superior dynamics of the reaction effectively speeding the reaction up among other beneficial effects.

Definitions

For purposes of the present specification, the following terms shall have the meanings set forth:

By "critical current density" is meant the maximum measured supercurrent divided by the overall wire diameter at a specified temperature and magnetic field. This is the key figure of merit for a superconductor.

By "non-copper critical current density" is meant the maximum measured supercurrent divided by the overall wire diameter at a specified temperature and magnetic field discounting the copper stabilizing region. As most $Nb_3Sn$ strands are integrated with a non-superconducting copper stabilizer region, this value removes for comparison the area fraction of copper stabilizer so that the properties of the superconducting package region can be compared between conductors of differing copper stabilizer fractions.

By "layer critical current density" is meant the maximum measured supercurrent divided by the overall wire diameter at a specified temperature and magnetic field discounting both the stabilizing copper on the outside of the diffusion barrier and the unreacted residual bronze phase (see, infra) and void space on the inside of the diffusion barrier. This value removes both the stabilizing copper on the outside of the diffusion barrier (see, infra) and the unreacted residual bronze phase (see, infra) and void space on the inside of the diffusion barrier. This leaves as the cross sectional area only the amount of $Nb_3Sn$ after reaction. If the quality of the $Nb_3Sn$ phase is poor, it will have a lower critical current density than the same amount of high quality $Nb_3Sn$. The methods described herein produce high overall critical current density in part because the layer critical current density is higher than previously achieved in $Nb_3Sn$ wires.

By "subelement" is meant the elements that are grouped together to form the final restack. In a "distributed barrier" design, rods of copper-encased Nb and a tin source are assembled in a diffusion barrier of Nb before restacking in a copper tube. The elements that are grouped together to form the final restack are called subelements. It is the restack that is drawn to the final wire. The subelements are the key building blocks of the final wire. As ideally this outer Cu tube is inert during the reaction sequence, all the important activity (diffusion and reaction) occurs inside the subelement. Key features of the methods described herein are the metal area and size ratios within the subelement.

By "local area ratio" or LAR is meant the area or volume ratio of the Cu to Nb in the local region of the filament pack region of the subelement. FIG. 1 shows a magnified "local region" of the numerous monofilament rods 10 that in FIG. 3 define the "filament pack region" 15 of subelement 22. Each monofilament rod 10 is composed of Nb 11 and Cu 12. The LAR is the area or volume ratio of the Cu to Nb in the local region of the filament pack region of the subelement. It represents both how closely the Nb filaments are spaced and the width of the Cu channels (necessary for Sn diffusion at the reaction stage). As much of the volume of the subelement is occupied by the Nb filament pack region, the value for the LAR largely influences the overall fraction of Nb in the conductor. LAR=Cu area %/Nb area %, with Cu area %+Nb area %=1 Sn wt %/(Sn wt %+Cu wt %) within a diffusion barrier.

Internal tin wire requires Sn diffusion through Cu to react with the Nb. In doing so various bronze phases are formed, each having specific ratios of Sn and Cu. However Sn wt %/((Sn wt %+Cu wt %), refers to a value that would be the overall weight ratio of Sn to Sn+Cu within the diffusion barrier of the subelement, even if it does not represent a true bronze phase in existence. It is instead used to illustrate how much overall Sn is available to react with the Nb within the subelement.

The "Nb in Cu local area ratio (LAR)" may not be a single, static value through the subelement. The LAR may be adjusted or graded within a billet to provide different effects in the final product. The LAR may be adjusted or graded to provide a higher LAR in or near the center and a lower LAR near the periphery, near to or proximate to the barrier. This may result in improving the current at small subelement dimensions. Varying the LAR in or near the center may change the dynamics of bronze formation and the formation of the ternary phase which acts as a regulatory membrane. Varying the LAR may also create circuitous routes for Sn diffusion through the subelement. This may result in delaying the reaction at smaller sizes and preserving the residual resistivity ratio (RRR).

Figure 3:
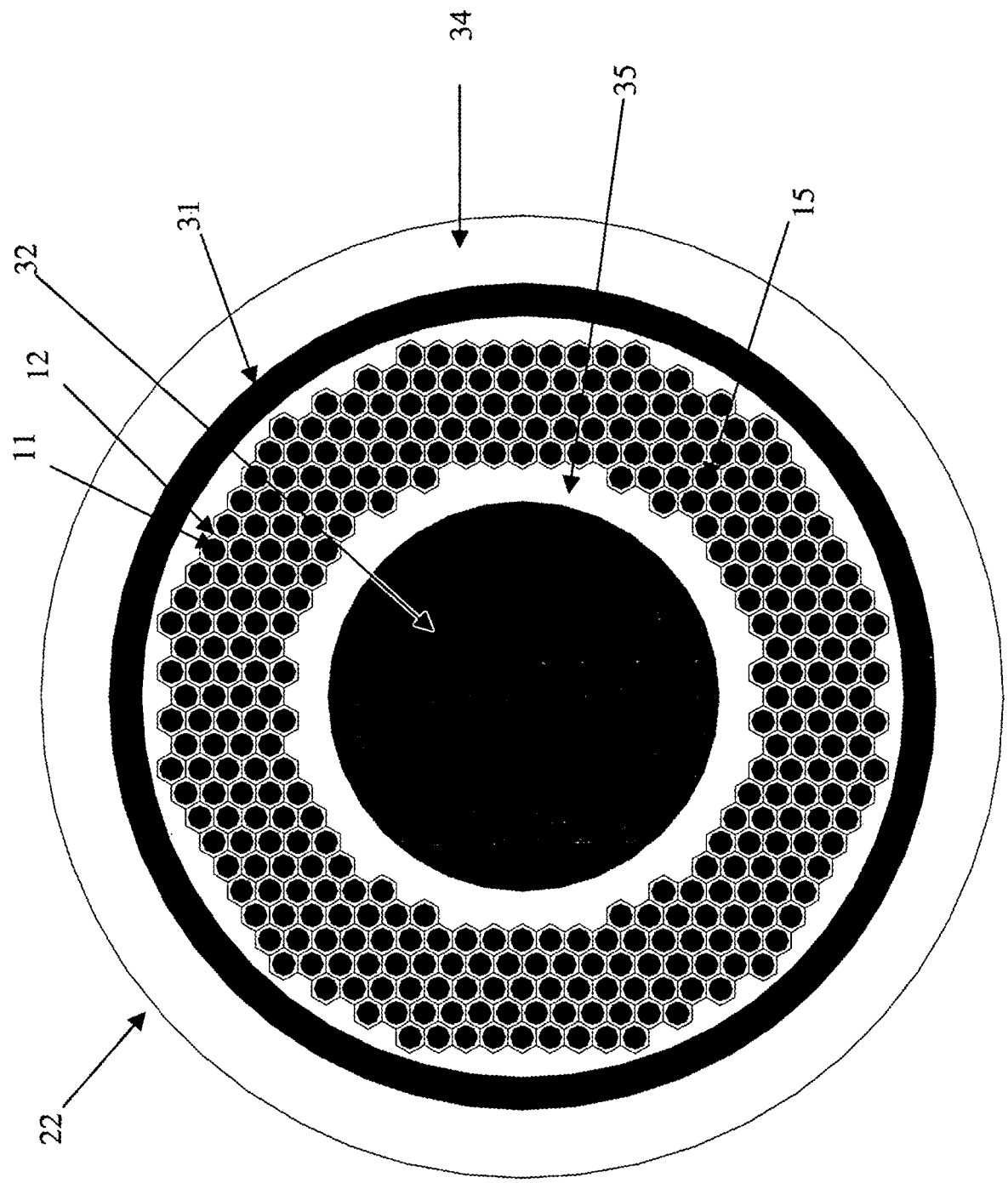
FIG. 3 is an enlarged cross-sectional illustration of one subelement used in the wire of FIG. 2, prior to the wire being subjected to heat treatment.
Figure 8:
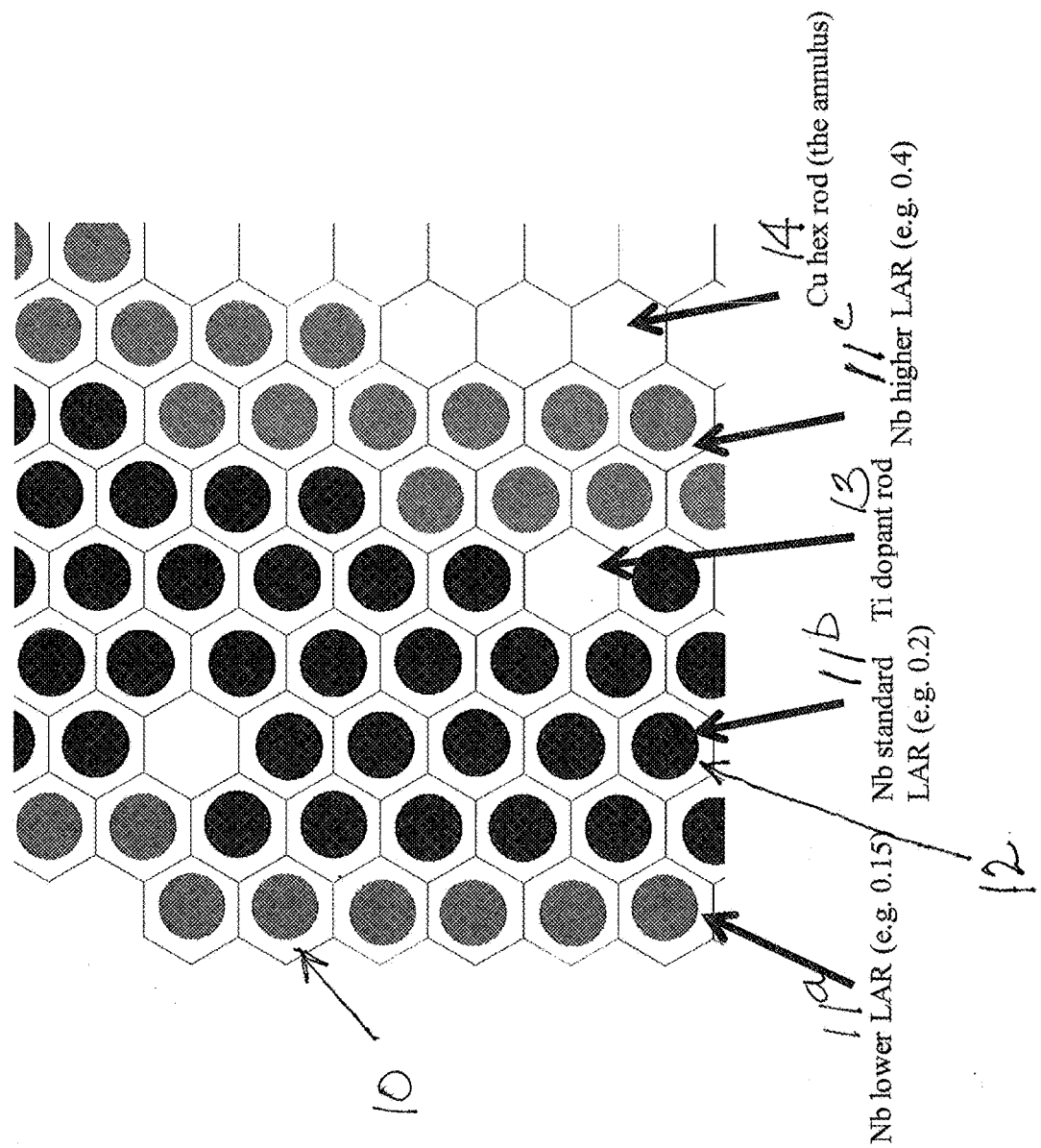
FIG. 8 is a second illustration of a filament pack to assist in defining the local area ratio or LAR, similar to FIG. 1. This demonstrates graphically that the LAR may be adjusted or graded to provide a higher LAR in or near the center and a lower LAR near the periphery, near to or proximate to the barrier.

FIG. 8, similar to FIG. 1, shows a magnified "local region" of the numerous monofilament rods 10 that in FIG. 3 define the "filament pack region" 15 of subelement 22. Each monofilament rod 10 is composed of Nb 11 and Cu 12. The LAR is the area or volume ratio of the Cu to Nb in the local region of the filament pack region of the subelement. It represents both how closely the Nb filaments are spaced and the width of the Cu channels (necessary for Sn diffusion at the reaction stage). As much of the volume of the subelement is occupied by the Nb filament pack region, the value for the LAR largely influences the overall fraction of Nb in the conductor. LAR=Cu area %/Nb area %, with Cu area %+Nb area %=1 Sn wt %/(Sn wt %+Cu wt %) within a diffusion barrier. FIG. 8 shows microfilament rods 10 composed of Nb of a lower LAR near the periphery (11a), Nb of a standard LAR moving toward the center away from the periphery (11b), and Nb of a higher LAR nearer the center (11c). Also shown are a Ti dopant rod (13) and a Cu hexagonal rod (14). This demonstrates graphically that the LAR may be adjusted or graded to provide a higher LAR in or near the center and a lower LAR near the periphery, near to or proximate to the barrier.

By "atomic Nb: Sn" is meant the atomic ratio of Nb to Sn. Ideally this is 3:1 to form stoichiometric $Nb_3Sn$. If extra unreacted Nb barrier is to be left over after the heat treatment sequence, this value must be greater than 3:1. A layer of unreacted Nb barrier is often desired to prevent Sn from diffusing into the matrix Cu outside of the diffusion barrier, and lowering the wire residual resistivity ratio (RRR) and stability. If this value is much greater than 3:1, then there is much more Nb in the subelement than is needed to form $Nb_3Sn$, and although the RRR will be high, there is wasted space within the subelement, lowering the non-Cu critical current density.

In the methods described herein, the selection of $Nb_3Sn$ wire design parameters incorporates an understanding of the factors that result in high $J_c$. The design combines high Nb and Sn fractions, necessary to achieve a high $Nb_3Sn$ fraction in the final wire, with a small Cu fraction, but one still suitable to meet the nine objectives listed below. This caveat means that the Cu must have the proper distribution and/or alloying elements that result in a thorough conversion of the Nb to a high quality $Nb_3Sn$ microstructure.

For purposes of the methods described herein, the important materials details of the wire design that influence the $J_c$ include the following:

1. The Nb area fraction including and within the Nb diffusion barrier of the subelement;
2. The Nb to Sn atomic ratio including and within the Nb diffusion barrier of the subelement;
3. The area ratio of Sn to Cu within the "non-Cu fraction" Sn wt %/(Sn wt %+Cu wt %) within the Nb barrier envelope of the subelement;
4. The area ratio of Cu and Nb in the filament package (Local Area Ratio);
5. A distributed barrier (infra) approach, as opposed to a single diffusion barrier approach;
6. The Nb diffusion barrier that can be reacted to form $Nb_3Sn$;
7. The ratio of Nb diffusion barrier thickness to filament diameter, and thus the Nb distribution (fractions) between filaments and outer diffusion barrier;
8. Nb filament and Nb barrier ring absolute size in final wire; and
9. Minimizing the dissolution of Nb filament in a Sn rich environment and excessive $Nb_3Sn$ grain growth during heat treatment while fully converting the filaments to $Nb_3Sn$.

Regarding the Nb area fraction including and within the Nb diffusion barrier of the subelement, the Nb area fraction must be maximized in the non-copper region in the subelement (i.e. inside and including the Nb diffusion barrier), but it is limited by the amounts of Cu and Sn simultaneously required in the non-copper region. The Nb fraction comes from the diffusion barrier and the enclosed Nb filament pack region. The individual Nb filaments are created by combining Nb with some form of Cu cladding. Often this is by extrusion of a Nb ingot in a Cu jacket which is reduced and formed to hexagonal cross section by wire drawing for ease of fabrication. However, it can be formed by wrapping Cu foil on round rods and assembling a pack of round monofilaments. The details of the assembly are not critical. However, it is critical that the area fraction of Nb including and within the diffusion barrier is from 50-65% of the area specified.

Regarding the Nb to Sn atomic ratio including and within the Nb diffusion barrier of the subelement, an ideal Nb to Sn atomic ratio within the subelement should be close to the atomic ratio of $Nb_3Sn$, 3:1. However, practical considerations impact this ratio, as full conversion to $Nb_3Sn$ would, because of naturally occurring variations of thickness of the barrier tube, result in tin diffusion to the stabilization matrix. This leakage in turn lowers RRR and stability of the wire, making it difficult to achieve the theoretical critical current without quenching the sample. Therefore, in practice this minimum ratio is about 3.3:1, but less than about 3.7:1 to minimize the underutilized wire cross-section consisting of unreacted Nb. A value of below 3:1 does not prevent $J_c$ of at least 2000 A/mm$^2$ (4.2 K, 12 T) if other key parameters are in place, but it does greatly decrease RRR and make it an impractical conductor. The understanding and control of this parameter are important to the methods described herein.

Figure 4:
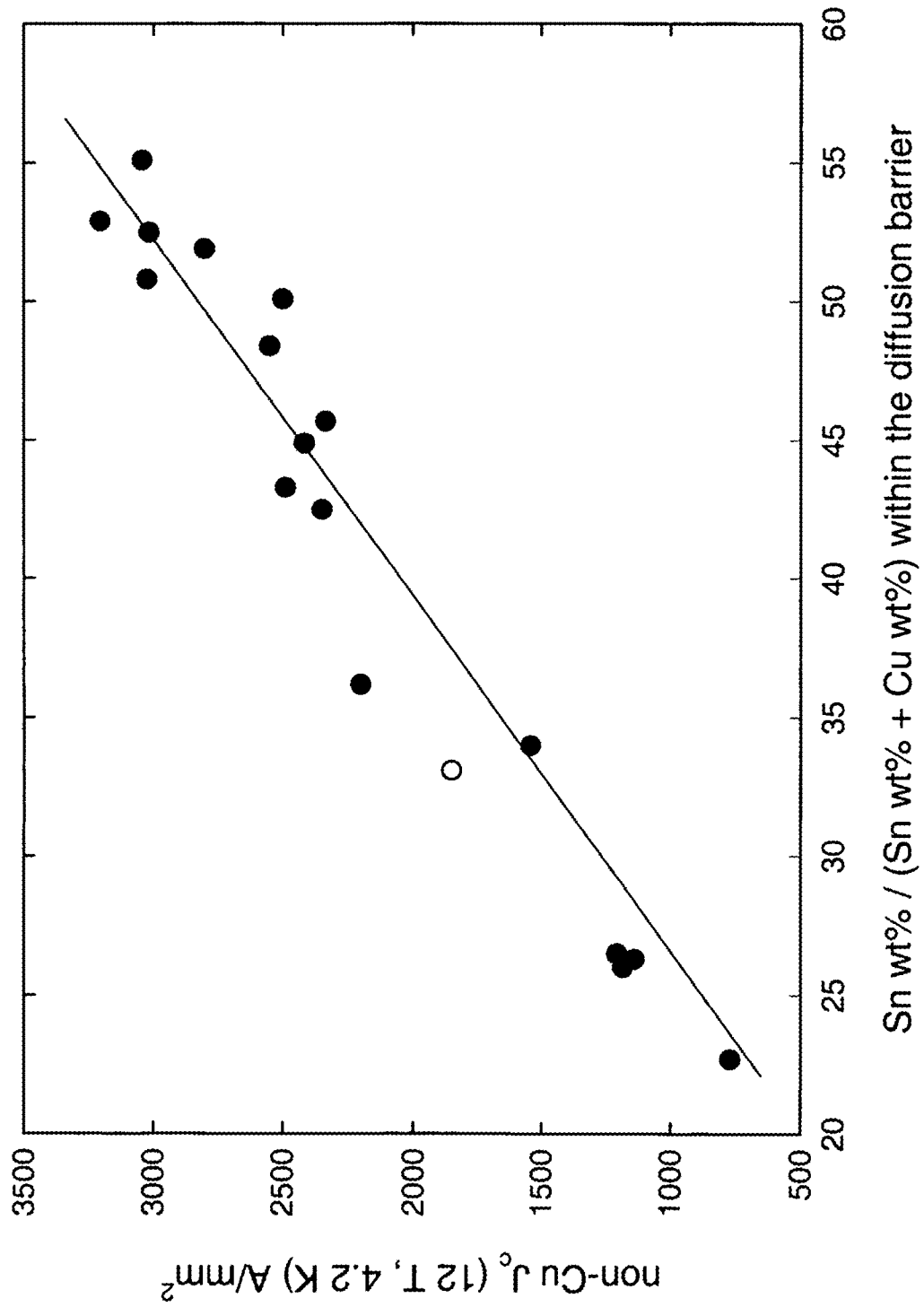
FIG. 4 is a plot of the non-copper critical current density vs. Sn wt %/(Sn wt %+Cu wt %) inside the diffusion barrier for a Ti or Ta doped $Nb_3Sn$.

Regarding the area ratio of Sn to Cu within the "non-Cu fraction" Sn wt %/(Sn wt %+Cu wt %) within the Nb barrier envelope of the subelement, the Sn wt %/(Sn wt %+Cu wt %) within the diffusion barrier is a critical parameter. Values are needed above about 45%, and up to about 65%, but preferably from 50%-60% in order for the Sn to react quickly with the Nb alloy to form a very high quality $Nb_3Sn$ phase. Regarding the non-copper $J_c$, the effect of the Sn wt %/(Sn wt %+Cu wt %) within the diffusion barrier in the internal tin wire is illustrated in FIG. 4. Although this plot is for the Ta or Ti doped variant of $Nb_3Sn$, a similar, but lower $J_c$, relationship would pertain to undoped $Nb_3Sn$. A high value of the Sn wt %/(Sn wt %+Cu wt %) within the diffusion barrier, while of paramount importance, cannot guarantee high current density if the other listed criteria are not also observed. In the past, high values of Sn wt %/(Sn wt %+Cu wt %) within the diffusion barrier have existed in prior art "tube process" $Nb_3Sn$ with poor results.

Regarding the area ratio of Cu and Nb in the filament package (Local Area Ratio), the local area ratio (LAR) must be small, preferably in the range of from 0.10 to 0.30. Minimizing LAR is critical to enhancing item 1, the amount of Nb that can be located in the subelement. However, LAR must be greater than zero as Cu is needed to act as a diffusion network for tin. The lack of a copper diffusion network in "tube process" internal tin is why that process failed to deliver high $J_c$ despite high Sn wt %/(Sn wt %+Cu wt %) within the diffusion barrier.

Figure 2:
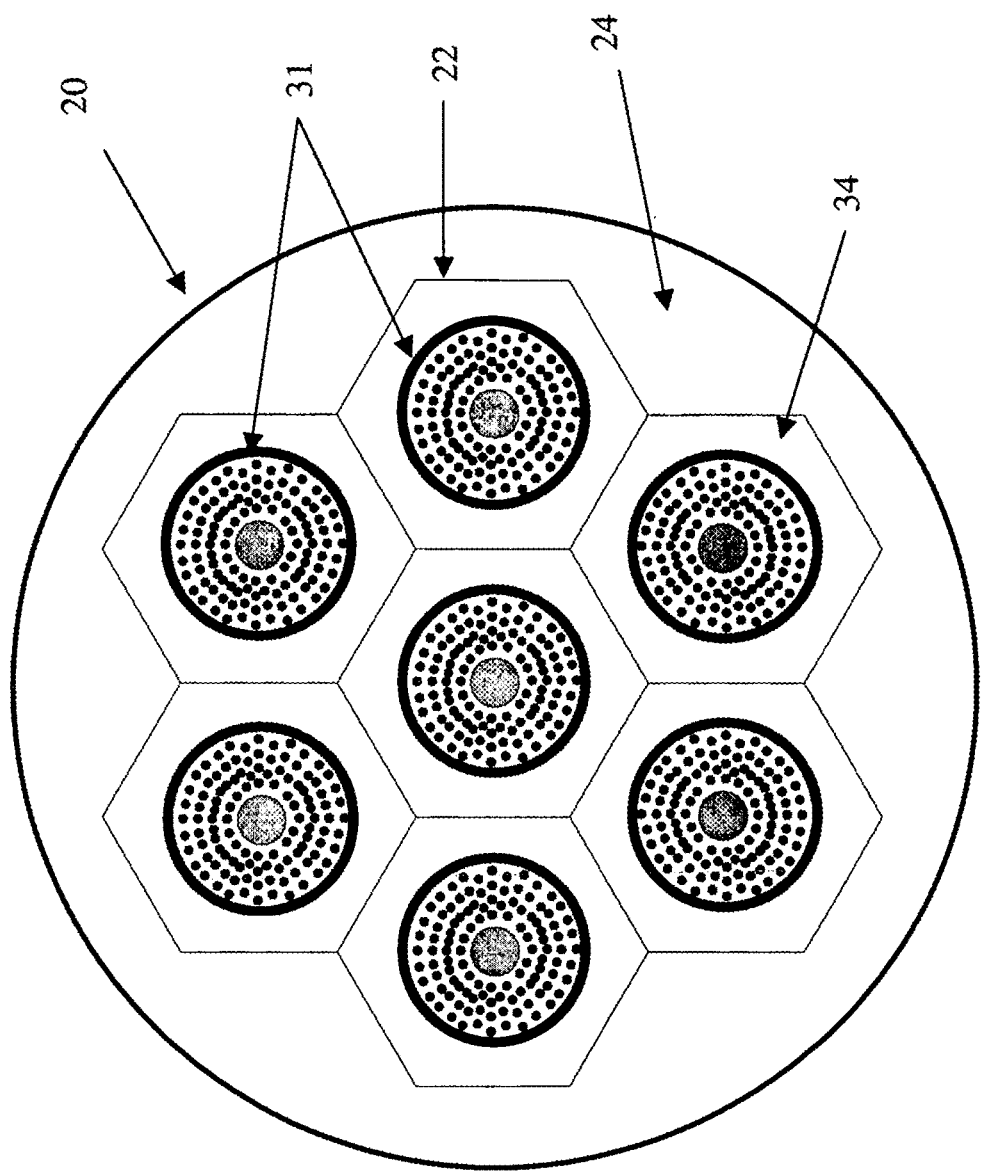
FIG. 2 is a schematic cross-sectional view (not to scale) of a superconductor wire as described herein prior to the wire being subjected to heat treatment.

Regarding a distributed barrier approach, as opposed to a single diffusion barrier approach, a distributed barrier of Nb is used. The term "distributed barrier" refers to a strand design where each subelement has its own diffusion barrier, as opposed to a diffusion barrier around the entire collection of subelements as seen in many internal tin wires such as the internal tin designs proposed for the ITER fusion tokamak project. One prior art internal tin wire made in commercial quantities by the distributed barrier method, the "Modified Jelly Roll," is described by U.S. Pat. Nos. 4,262,412 and 4,414,428, the disclosures of which are herein incorporated by reference. The distributed barrier approach allows for lower Cu fractions within the subelement. This feature enhances the Sn wt %/(Sn wt %+Cu wt %) within the diffusion barrier because in the single barrier approach, due to practical handling concerns, a significant amount of copper must be left on the outside of a subelement before it can be restacked in a barrier. This in turn dilutes the Sn wt %/(Sn wt %+Cu wt %). In the methods described herein, the distributed barrier also provides for a continuous web of high conductivity copper between all of the subelements, enhancing electrical stability. The single barrier construction is electrically meta-stable or unstable with respect to current carrying capacity, especially at higher $J_c$ levels. An illustration of a distributed barrier wire is shown in FIG. 2, where seven subelements 22, each having their own barrier 31 are distributed throughout the cross-section.

Regarding a Nb diffusion barrier that can be reacted to form $Nb_3Sn$, a reactable Nb ring is used as the diffusion barrier. This feature is key to maximizing the Nb content in the non-copper portion of the wire. Many internal tin wire designs feature an inert Ta diffusion barrier, but this uses valuable space in the subelement cross-section. Using Nb, this space may be converted to a useful superconductor. However, the Nb must be thick enough so that not all of it reacts, thus preventing tin from diffusing into the copper stabilizer matrix. Achieving this proper balance is one of the benefits of the methods described herein.

Regarding the ratio of Nb diffusion barrier thickness to filament diameter, and thus the Nb distribution (fractions) between filaments and outer diffusion barrier, the thickness of the Nb diffusion barrier must be sufficient to ensure that at some stage during the heat treatment the filaments are fully reacted yet the barrier is only partially reacted. Thus, additional time in the heat treatment is used to controllably react the fraction of barrier desired. However it should not be too thick. Otherwise, the non-copper region will have too large a fraction of unreacted Nb, reducing the non-copper $J_c$. Preferably the barrier thickness to filament radius is between 1:1 to 6:1. The relationship between the thickness of the barrier and the filaments also dictates the barrier fraction of the non-copper portion of the subelement.

Regarding the Nb filament and Nb barrier ring absolute size in the final wire, the absolute size of the filaments and barrier is critical in determining if the Nb reacts completely within a practical heat treatment time. Typically for internal tin heat treatments, longer and/or higher temperature heat treatments results in larger $Nb_3Sn$ grain sizes and reduced layer critical current density at moderate magnetic fields, i.e. 12-16 Tesla. Therefore smaller Nb filaments allow a heat treatment to be chosen to minimize grain size throughout a fully reacted filament, yet react the barrier not fully but instead about 50-90%. Typically this Nb filament diameter must be at least 0.5 μm but no more than 7 μm in the finished wire condition, preferably from 1 μm to 5 μm.

In general, providing at least a certain percentage of Nb filaments having smaller dimensions, i.e. finer with more rows, may provide improved current in the resulting multi-filament $Nb_3Sn$ superconducting wire. For instance, providing at least 25%, 33%, 50%, 67%, 75%, 80% or 90% or so of the Nb filaments having a diameter of less than about 1.0 μm or 1.5 μm or 2.0 μm or 2.5 μm or 3.0 μm or 4.0 μm or 5.0 μm may be particularly advantageous.

Regarding minimizing the dissolution of Nb filament in a Sn rich environment and excessive $Nb_3Sn$ grain growth during heat treatment while fully converting the filaments to $Nb_3Sn$, the selection of a proper heat treatment is the final step needed to produce a high $J_c$ conductor. It is possible to choose all the proper design parameters but over or under react the wire by heat treatment so as to achieve less than optimum $J_c$ values. The heat treatment must be chosen so as to react all of the filaments and most, but not all of the diffusion barrier. This must be determined empirically as the optimal heat treatment for a fixed wire design varies by subelement size and thus wire diameter. Essentially independent of wire diameter, the first two sequences are typically 210° C. for about 48 hours and 400° C. for about 48 hours. These two steps are needed to form the bronze phases and start the tin diffusion through the copper matrix. If these steps are omitted, the wire is subject to tin bursting, and if they are too lengthy, the tin rich bronze phases can dissolve Nb in the inner filament ring, reducing the Nb available for reaction. For subelements larger than about 100 μm in finished wire, a 570° C. sequence for about 48 hours is helpful to aid in tin diffusion. The $Nb_3Sn$ formation step is optimal between 625° C. and 725° C., with the length on the order of 10 to greater than 200 hours, depending on subelement size. A heat treatment study is needed to establish the optimal heat treatment per wire design.

It is well known in the literature that alloys of Nb (e.g. Nb—Ta, Nb—Ti, Nb—Ta—Ti) and/or alloys of Sn (e.g. Sn—Ti, Sn—Cu) are normally required to produce the highest $J_c$ strand. Nb and Sn alloy selection is also an important design parameter and some doping with e.g. Ta and/or Ti is useful to achieve the best properties. In addition, the fact that Ta doped $Nb_3Sn$ reacts more slowly than Ti doped $Nb_3Sn$ at the final heat treatment plateau if that plateau is around 630° C., can be used to create a more effective diffusion barrier by making the subelement diffusion barrier of Nb7.5 wt % Ta alloy and doping the filaments with Nb47 wt %Ti rods. Thus, when for subelements in the 20-70 micron range a relatively long heat treatment at approximately 630° C. results in a conductor having maximum $J_c$ and RRR.

According to the methods described herein, the following parameters are instrumental in producing the desired properties in the subelements that are then incorporated into the composite wire structures: Sn wt %/(Sn wt %+Cu wt %) within the diffusion barrier is at least 45%, preferably 50-55%; and atomic Nb: Sn is equal to or greater than 2.7 but not more than 3.7, preferably about 3.45; the LAR is from 0.5 to 0.1; a distributed barrier design is used; a barrier that is reactable to $Nb_3Sn$ (i.e., Nb) is provided; a barrier that is thicker than the Nb filament 11 radius from FIG. 1 is provided; and restacking and wire reduction so that the filament diameter is approximately 3 microns at the reaction stage is performed. All of these parameters are required in order to assure that the final heat treated strand exhibits a current density of 2000 A/mm² or greater.

FIG. 2 is a schematic cross-section of a wire 20, which following heat treatment comprises a multifilamentary superconductor. The wire 20 is not shown to scale, but it essentially contains a plurality of subelements 22 that are packed in a copper matrix 24. The shape of the subelement 22 at restack in this schematic is hexagonal, but in FIG. 3 it is round. Such shapes are commonly used to aid assembly of superconducting wire and are achieved by wire drawing using shaped metalworking dies. Still, the subelement 22 can be any shape convenient for restacking, and this restacking shape is not critical to achieve the high critical current density. The number of subelement hex rods in FIG. 2 is seven, but this can vary from 1 to more than 100. Wire 20 is in its final form as is known in the art the predecessor subassemblies have themselves undergone a series of restacks with copper-encased Nb rods, and then mechanical working including drawing to reduce the subassemblies 22 to the configuration shown in FIGS. 1 and 2. The Cu 24 outside subelements 22 is typically 20%-60% of the final wire area, but could be more or less depending on the application. This value does not affect the critical current density of the subelements, only the total supercurrent of the wire.

Individual subelements 22 are best seen in the enlarged cross-sectional in FIG. 3. The subelement is generally manufactured within a copper jacket 34. For determining the key metal ratios of the subelement, only the metal ratios including and within the Nb barrier 31 are considered. This is the non-Cu portion of the subelement. The subelement 22 includes a Sn or Sn alloy center 32. This alloy is almost entirely Sn. It typically includes less than 1% by weight of Cu, though other Sn alloys are possible. Sn alloy center 32 constitutes about 23% to 27% of the non-copper area of the subelement. Each subelement 22 includes a plurality of Nb filaments 11 encased in a surrounding layer of copper 12. Copper 35 also surrounds the Sn based center 32. The local area ratio (LAR), is that ratio within the Nb filament rod region 15 of the intervening copper 12 and the filaments 11. A Nb barrier 31 is also present in each subelement 22. The Nb barrier 31 prevents the Sn from substantial diffusion into the copper-filled stabilizing regions 34 between subelements 22 and partially reacts to $Nb_3Sn$ contributing to the critical current density. The area sum of the all the copper within the diffusion barrier 31 constitutes about 15% to 25% of the subelement area.

During the initial 210° C. stage of the heat treatment of wire 20, the Sn diffuses into the copper matrix, e.g., starting at 35, forming high Sn % bronze phases. During the 400° C. heat treatment stage, Sn further diffuses from 35 to the intervening copper 12. If the wire is heated directly to the $Nb_3Sn$ reaction stage without these pre-reaction sequences, the rapid conversion of tin from solid to liquid can lead to rapid differential expansion and the tin bursting through the subelement. One of the benefits of the methods described herein is that subelements of high Nb and Sn wt %/(Sn wt %+Cu wt %) can be successfully converted by heat treatment to form a large volume fraction of high quality $Nb_3Sn$. Allocation of some Nb in both the reactable diffusion barrier and within a copper web containing Nb filaments is of prime importance to achieve a wire capable of high $J_c$ without the wire experiencing Sn bursting out of the subelement during heat treatment. The methods described herein thus eliminate a defect of the "tube process" whereby high Sn wt %/(Sn wt %+Cu wt %) wires experienced tin bursting.

For subelements larger than 100 μm, a 570° C. sequence for about 48 hours can be added to aid in tin diffusion to the filaments furthest from the tin source. During the 625° C. to 725° C. heat treatment stage, Cu—Sn phases react rapidly with the Nb filaments 11. The Nb barrier 31 also reacts during the 625° C. to 725° C. stage to contribute to the non-copper critical current density. The degree of barrier reaction is controlled by the temperature and length of the final heat treatment stage. It is up to the end user to trade off between critical current density and RRR, as increased reaction time eventually leads to decreased RRR. The Nb filaments 11 and barrier 31 constitute about 55% to 60% of the subelement area.

Table 1 summarizes the key parameters necessary to create the wire of this invention.

TABLE 1

| Parameter | Range | Preferred Range |
|---|---|---|
| Total Nb content | 50-65% of Non-Cu | 55-60% of Non-Cu |
| Sn wt %/((Sn wt % + Cu wt %) within the diffusion barrier | 45-65% | 50-60% |
| Local Area Ratio | 0.10-0.50 | 0.15-0.45 |
| Nb to Sn atomic ratio | 2.7-3.7 | 3.1-3.6 |
| Nb filament diameter | 0.5-7 microns | 1-5 microns |
| Nb diff. barrier thickness | 0.8-11 microns | 1.5-8 microns |
| Nb barrier fraction of Nb | 20-50% | 25-35% |

The invention is further illustrated by the following Example, which, however, is to be deemed illustrative and not limiting the invention:

EXAMPLE 1

Figure 5:
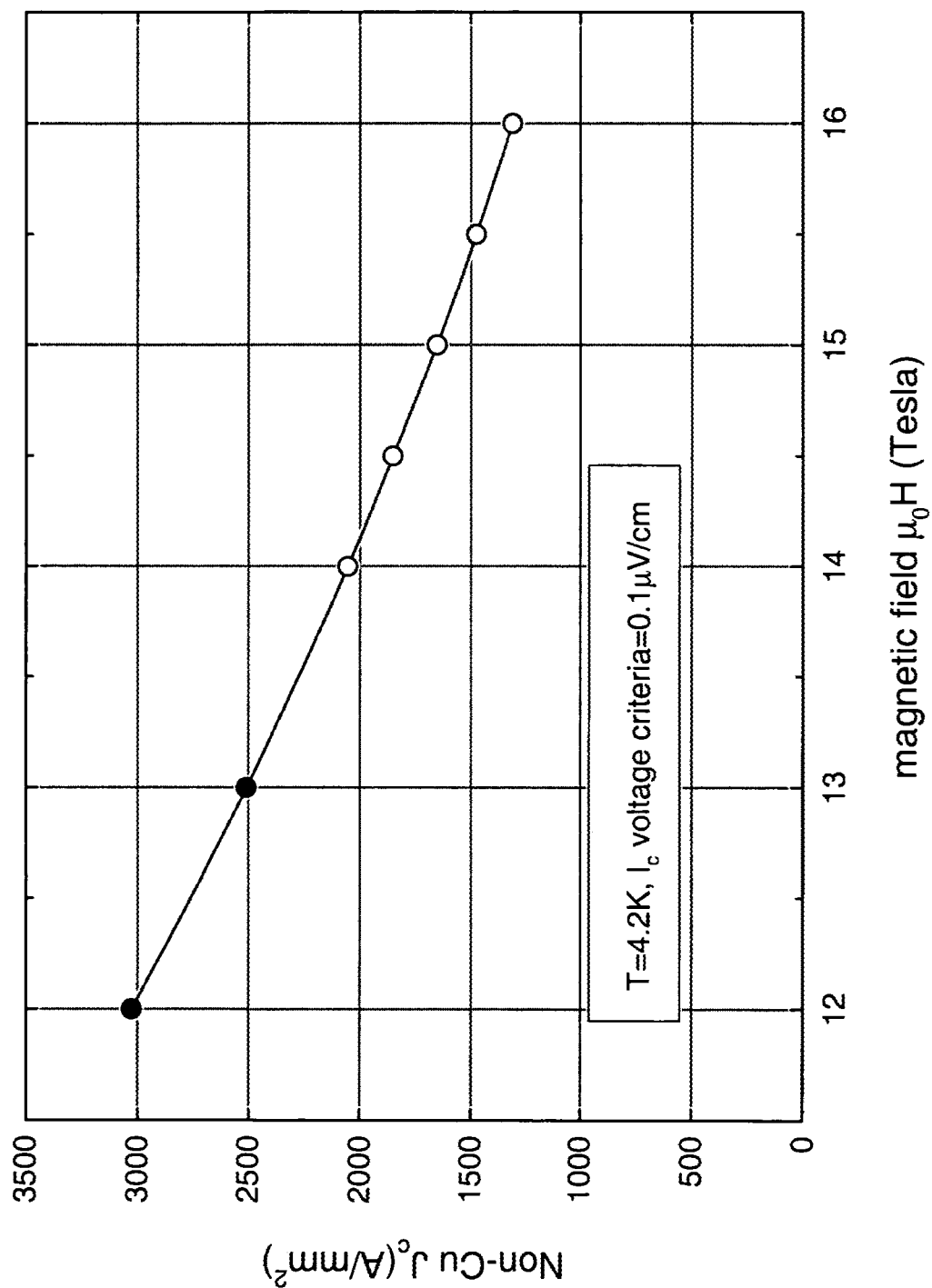
FIG. 5 is a plot of non-copper critical current density vs. magnetic field at 4.2K from 12 T to 16 T for a wire produced in accordance with the present invention.
Figure 6:
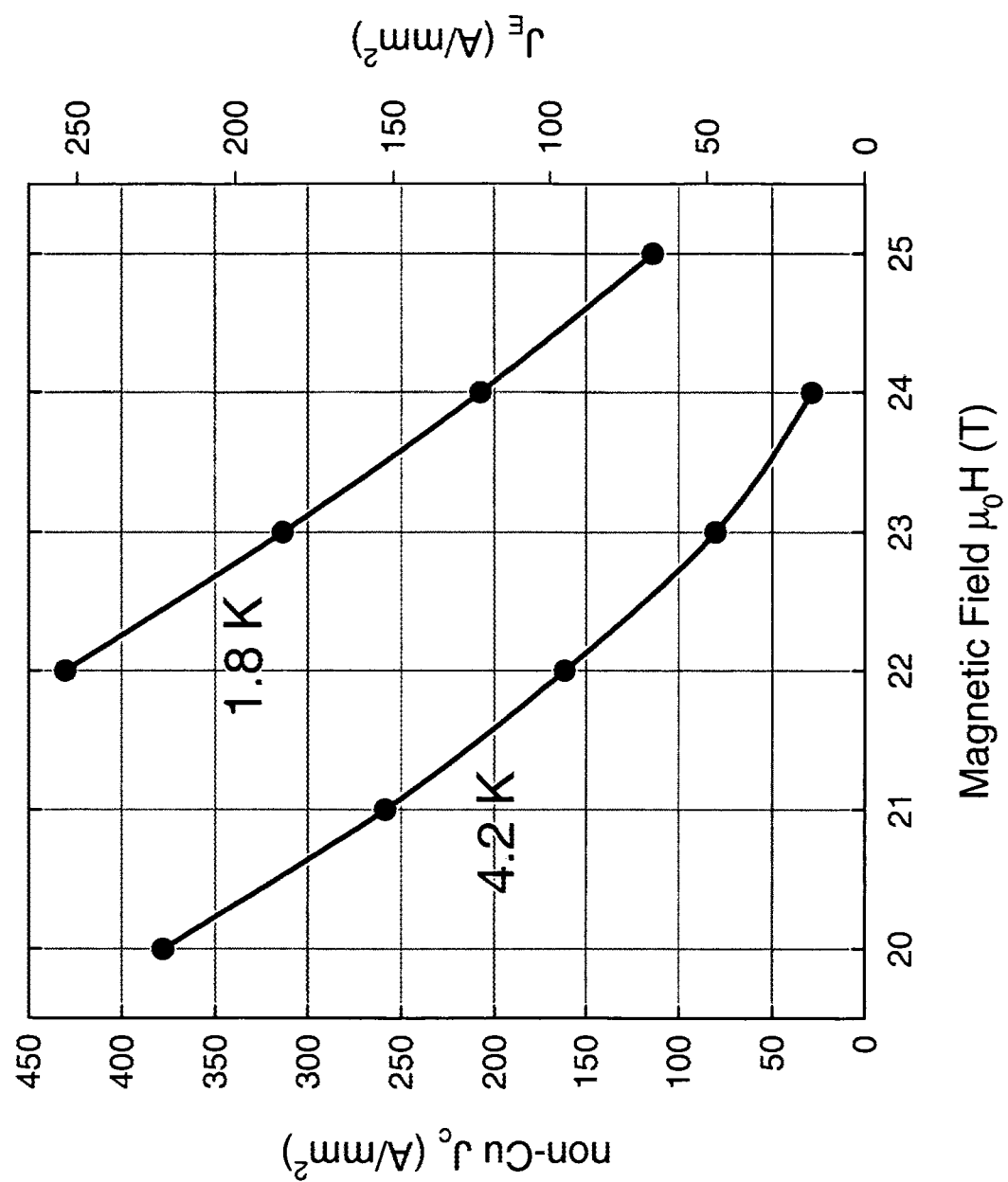
FIG. 6 is a plot of engineering and non-copper critical current density vs. magnetic field at 4.2K and 1.8K from 20 T to 25 T for a wire produced in accordance with the present invention.
Figure 7:
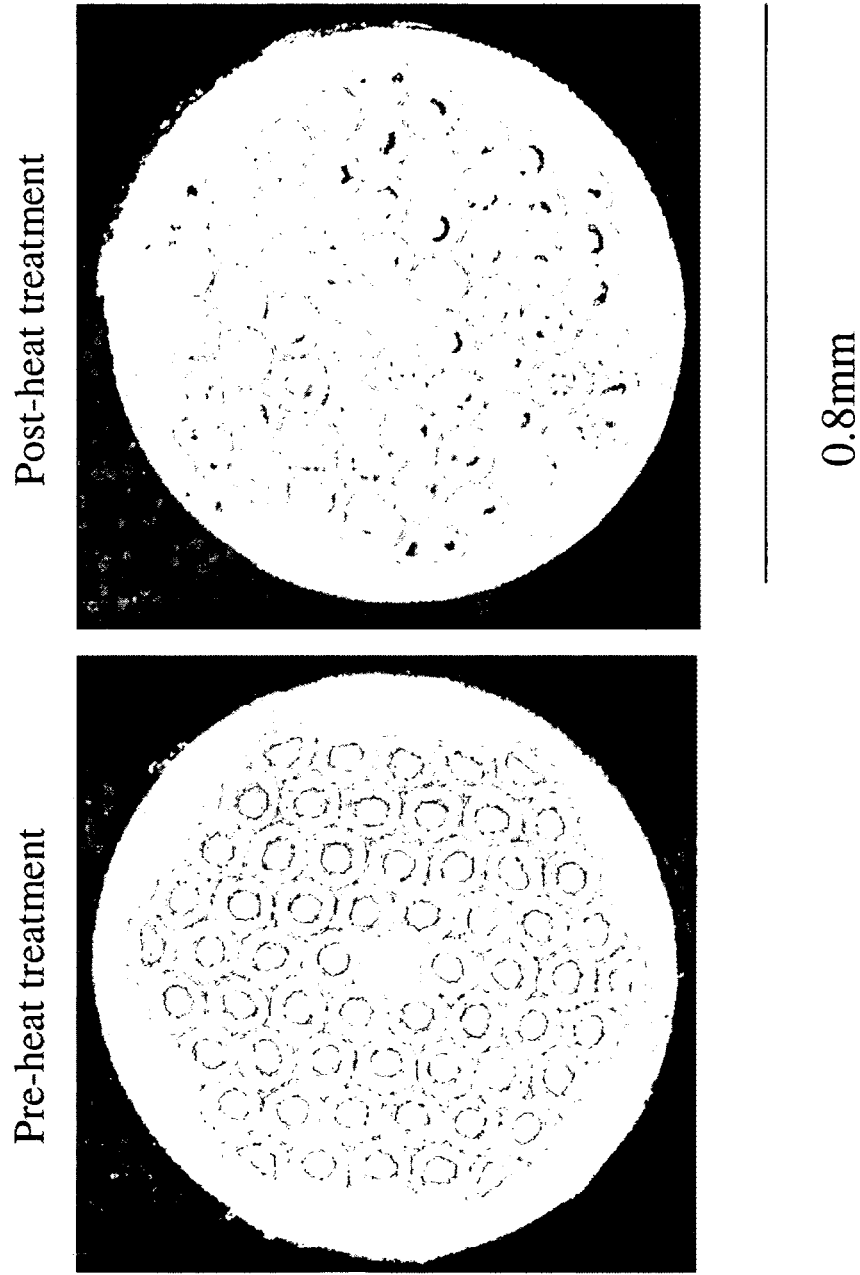
FIG. 7 shows photomicrographs of wire produced by the method of the present invention before and after heat treatment reaction.

In the course of developing and refining the methods described herein, several different wires were prepared which illustrate the principles described above. The Nb alloy used for the filaments and the diffusion barriers was Nb7.5 wt % Ta, and the Sn alloy used was Sn0.7 wt % Cu. The bulk of the wire was fabricated to 0.7 mm or 0.8 mm diameter, although shorter lengths were made from 0.4 mm to 1.6 mm diameter, corresponding to a subelement size range of 35 μm-195 μm and a filament size range of 0.9 μm-5 μm. Final piece lengths were as good as or better than internal tin wire made by the Modified Jelly Roll process, with >1 km piece lengths routinely achievable in 0.7 mm and 0.8 mm diameter wire, demonstrating that the improved properties of the wires do not come at the expense of manufacturability. All the wires conformed to the preferred parameters listed in Table 1. The plot in FIG. 5 shows the critical current density behavior of an optimized wire measured at 4.2 K from 12 Tesla to 16 Tesla applied magnetic field range. It is to be noted that the ~50% improvement of the 4.2K, 12 T $J_c$ values of this wire is across a wide range of magnetic field. The plot shown in FIG. 6 of $J_c$ and $J_E$ (engineering critical current density, i.e. the cross section includes the copper stabilizer) at 4.2 K and 1.8 K from 20 T to 25 T shows the usefulness of a sample wire for magnets over 23 T, previously thought to be achievable only through the use of difficult to manufacture $Nb_3Al$ or high temperature superconductors. Cross section micrographs of a typical sample wire are shown in FIG. 7 for pre-heat treatment and following post-heat treatment. These demonstrate that the key components for producing the 3000 $A/mm^2$ class material pursuant to the invention are well understood, reproducible, and controllable.

While the present invention has been described in terms of specific embodiments thereof, it will be understood in view of the present disclosure, that numerous variations upon the invention are now enabled to those skilled in the art, which variations yet reside within the scope of the present teachings. Accordingly, the invention is to be broadly construed, and limited only by the scope and spirit of the claims now appended hereto.

We claim:

1. A method for producing a multifilament $Nb_3Sn$ superconducting wire comprising:
   a) packing a plurality of Cu encased Nb rods within a matrix which is surrounded by an intervening Nb diffusion barrier and a jacket on the other side of the barrier remote from the rods, to thereby form a packed subelement for the superconducting wire, the matrix comprising a low tin bronze having a weight ratio of Cu 0.1-2.5 wt % Sn;

b) providing a source of Sn within the subelement;

c) assembling the metals within the subelement, the relative sizes and ratios of Nb, Cu and Sn being selected such that c1) the Nb fraction of the subelement including and within the diffusion barrier is 50-65% by area, c2) the atomic ratio of the Nb to Sn including and within the diffusion barrier of the subelement is between 2.7 and 3.7, c3) the ratio of the Sn to Cu within the diffusion barrier of the subelement is such that the Sn wt %/(Sn wt %+Cu wt %) is 45%-65%, c4) the Cu to Nb local area ratio of the Cu-encased Nb rods is 0.10-0.50, c5) the Nb diffusion barrier being fully or partially converted to $Nb_3Sn$ by heat treatment, and c6) the thickness of the Nb diffusion barrier is larger than the radius of the Nb portions of the Cu encased Nb rods;

d) assembling the subelements in a further matrix and reducing the assemblage to wire form such that d1) the multifilamentary $Nb_3Sn$ superconducting wire is comprised of a plurality of the subelements each having a Nb diffusion barrier to thereby form a wire having a distributed barrier design, d2) the Nb portions of the copper encased Nb rods in the final wire are of diameter between 0.5-7 µm before reaction, and d3) the Nb diffusion barrier that is fully or partially converted to $Nb_3Sn$ by heat treatment is 0.8-11 µm thick before reaction; and e) heat treating the final size wire from step d) to form the $Nb_3Sn$ superconducting phase.

2. The method in accordance with claim 1 further comprising providing a source of Ta or Ti or both to the subelement so as to form $(Nb, Ta)_3Sn$, $(Nb, Ti)_3Sn$ or $(Nb, Ti, Ta)_3Sn$ after heat treatment.

3. The method in accordance with claim 1 wherein the Nb fraction of the subelement is 55%-60% by area.

4. The method in accordance with claim 1 wherein the Nb barrier fraction of the total Nb content of the subelement is between 20-50% by area.

5. The method in accordance with claim 1 wherein the atomic ratio of the Nb to Sn in the subelement is between 3.1 and 3.6.

6. The method in accordance with claim 1 wherein the ratio of the copper to tin in the subelement is such that the Sn wt %/(Sn wt %+Cu wt %) within the diffusion barrier is 50-60%.

7. The method in accordance with claim 1 wherein the Cu to Nb local area ratio of the copper-encased Nb rods is 0.15-0.45.

8. The method in accordance with claim 1 wherein the Nb portions of the copper encased Nb rods in the final wire are 1-5 µm before reaction.

9. The method in accordance with claim 1 wherein the Nb diffusion barrier that is fully or partially converted to $Nb_3Sn$ by heat treatment is 1.5-8 µm thick before reaction.

10. The method in accordance with claim 1 wherein the Sn is diffused into the Nb rods by a heat treatment process that minimizes dissolution of the Nb in the annulus region with pre-reaction stages at 180° C.-220° C. for 24-100 hours, followed by 340°-410° C. for 24-50 hours, followed by $Nb_3Sn$ formation stage at 625° C.-725° C. for 12-200 hours.

11. The method in accordance with claim 10, where a fourth stage is added to the heat treatment sequence prior to the $Nb_3Sn$ reaction stage, of 560°-580° C. for 24-200 hours.

12. The method in accordance with claim 1 wherein the Cu encased Nb rods are formed into hexagonal cross sectioned rods for use in packing the subelement.

13. The method in accordance with claim 1 wherein the matrix contains Cu.

14. The method in accordance with claim 1 wherein at least 50% of the Nb portions of the copper encased Nb rods in the final wire have a diameter of less than about 2.5 µm.

15. The method in accordance with claim 1 wherein the Nb in Cu local area ratio (LAR) is adjusted or graded to provide a higher LAR in or near the center and a lower LAR near the periphery, near to or proximate to the barrier.

16. A method for producing a multifilament $Nb_3Sn$ superconducting wire comprising:

a) packing a plurality of Cu encased Nb rods within a matrix which is surrounded by an intervening Nb diffusion barrier and a further matrix jacket on the other side of the barrier remote from the rods, to thereby form a packed subelement for the superconducting wire, the subelement having a Nb in Cu local area ratio (LAR) that is graded such that it decreases radially outward toward the diffusion barrier;

b) providing a source of Sn within the subelement;

c) assembling the metals within the subelement, the relative sizes and ratios of Nb, Cu and Sn being selected such that c1) the Nb fraction of the subelement including and within the diffusion barrier is 50-65% by area, c2) the atomic ratio of the Nb to Sn including and within the diffusion barrier of the subelement is between 2.7 and 3.7, c3) the ratio of the Sn to Cu within the diffusion barrier of the subelement is such that the Sn wt %/(Sn wt %+Cu wt %) is 45%-65%, c4) the Cu to Nb local area ratio of the Cu-encased Nb rods is 0.10-0.50, c5) the Nb diffusion barrier being fully or partially converted to $Nb_3Sn$ by heat treatment, and c6) the thickness of the Nb diffusion barrier is larger than the radius of the Nb portions of the Cu encased Nb rods;

d) assembling the subelements in a further matrix and reducing the assemblage to wire form such that d1) the multifilamentary $Nb_3Sn$ superconducting wire is comprised of a plurality of the subelements each having a Nb diffusion barrier to thereby form a wire having a distributed barrier design, d2) the Nb portions of the copper encased Nb rods in the final wire are of diameter between 0.5-7 µm before reaction, and d3) the Nb diffusion barrier that is fully or partially converted to $Nb_3Sn$ by heat treatment is 0.8-11 µm thick before reaction; and e) heat treating the final size wire from step d) to form the $Nb_3Sn$ superconducting phase.

17. The method in accordance with claim 16 further comprising providing a source of Ta or Ti or both to the subelement so as to form $(Nb, Ta)_3Sn$, $(Nb, Ti)_3Sn$ or $(Nb, Ti, Ta)_3Sn$ after heat treatment.

18. The method in accordance with claim 16 wherein the Nb fraction of the subelement is 55%-60% by area.

19. The method in accordance with claim 16 wherein the ratio of the copper to tin in the subelement is such that the Sn wt %/(Sn wt %+Cu wt %) within the diffusion barrier is 50-60%.

* * * * *